US005393952A

United States Patent [19]

Yamaguchi et al.

[11] Patent Number: 5,393,952

[45] Date of Patent: Feb. 28, 1995

[54] PLASMA TORCH FOR CUTTING USE WITH NOZZLE PROTECTION CAP HAVING ANNULAR SECONDARY GPS PASSAGE AND INSULATOR DISPOSED IN THE SECONDARY GAS PASSAGE

[75] Inventors: Yoshihiro Yamaguchi; Hitoshi Satoh; Toshiya Shintani, all of Hiratsuka, Japan

[73] Assignee: Kabushiki Kaisha Komatsu Seisakusho, Tokyo, Japan

[21] Appl. No.: 107,815

[22] PCT Filed: Feb. 28, 1992

[86] PCT No.: PCT/JP92/00239

§ 371 Date: Aug. 18, 1993

§ 102(e) Date: Aug. 18, 1993

[87] PCT Pub. No.: WO92/15421

PCT Pub. Date: Sep. 17, 1992

[30] Foreign Application Priority Data

Feb. 28, 1991 [JP] Japan .................................. 3-017154
Apr. 12, 1991 [JP] Japan .................................. 3-033399

[51] Int. Cl.$^6$ ............................................ B23K 10/00

[52] U.S. Cl. ............................ 219/121.5; 219/121.51; 219/121.48; 219/75; 219/121.49

[58] Field of Search ........... 219/121.5, 121.51, 121.48, 219/75, 121.55, 121.49; 313/231.31, 231.41

[56] References Cited

U.S. PATENT DOCUMENTS

| | | | |
|---|---|---|---|
| 3,204,076 | 8/1965 | Browning | 219/121.5 |
| 4,125,754 | 11/1978 | Wasserman et al. | 219/121.5 |
| 4,341,947 | 7/1982 | Komura et al. | 219/383 |
| 4,389,559 | 6/1983 | Rotolico et al. | 219/121.5 |
| 4,521,666 | 6/1985 | Severance, Jr. et al. | 219/121.5 |
| 4,861,962 | 8/1989 | Sanders et al. | 219/121.5 |
| 4,954,688 | 9/1990 | Winterfeldt . | |

FOREIGN PATENT DOCUMENTS

| | | |
|---|---|---|
| 53-119753 | 10/1978 | Japan . |
| 57-165370 | 10/1982 | Japan . |
| 63-154272 | 6/1988 | Japan . |
| 2-20667 | 1/1990 | Japan . |
| 2091594 | 8/1982 | United Kingdom . |

OTHER PUBLICATIONS

"Welding Technology", vol. 6, Jun., 1988, pp. 115–121.

*Primary Examiner*—Mark H. Paschall
*Attorney, Agent, or Firm*—Frishauf, Holtz, Goodman & Woodward

[57] ABSTRACT

A plasma torch for cutting use comprises a torch body, a water-cooled electrode arranged in the torch body, a nozzle arranged outside the electrode so as to cover the electrode through a plasma gas passage formed therebetween, a nozzle cap covering the nozzle, a nozzle protection cap having, on its front end side, an opening opposing to an orifice of the nozzle and being disposed outside the nozzle cap through an annular secondary gas passage communicating with the opening, the nozzle protection cap being arranged in the secondary gas passage in an electrically insulated state from the electrode and the nozzle, and an insulator disposed in the secondary gas passage and formed of an electrically insulating material, the insulator having a rectifying passage for rectifying a gas flow passing the secondary gas passage. The nozzle protection cap is composed of a front end portion and a base end portion secured to the torch body and the front end portion and the base end portion are detachably coupled with each other.

13 Claims, 8 Drawing Sheets

PLASMA TORCH FOR CUTTING USE WITH NOZZLE PROTECTION CAP HAVING ANNULAR SECONDARY GPS PASSAGE AND INSULATOR DISPOSED IN THE SECONDARY GAS PASSAGE

TECHNICAL FIELD OF THE INVENTION

The present invention relates to a plasma torch utilized for a plasma cutting machine.

BACKGROUND OF THE INVENTION

First Prior Art (Water-cooled Torch)

This includes a torch of the type utilized for a plasma cutting machine in which an electrode and a nozzle are cooled by cooling water. In this type, the electrode is attached to a body of the torch, to which the nozzle is attached through a gas jetting port for jetting an operation gas by gyrating about a periphery of axes of an insulating member and the electrode. Portions of the nozzle, except for the front end including a nozzle orifice of the nozzle, are covered, and a nozzle cap for fixing the nozzle to the torch body is screwed with the torch body. In this structure, the cooling water after cooling the electrode passes a cooling water passage formed inside the torch body, then through a space defined by the torch body, the nozzle and the nozzle cap to cool the nozzle and then returns again to the cooling water passage formed to the torch body.

Second Prior Art (Nozzle Protection Cap in Air-cooling Nozzle)

In a plasma torch, at a time when a front end of the nozzle is exposed, there is a fear of damaging, in a welding operation, the nozzle by a fused metal (dross) blown up to the nozzle at a time of carrying out a piercing operation (cutting operation for forming a hole) to a thickened plate at a cutting start time, or there is a fear of damaging the nozzle due to an inaccurate discharge, called a double-arc, caused by the contact between the nozzle and a workpiece to be cut. To obviate these fears, in the air-cooling nozzle, a metallic nozzle protection cap electrically insulated from the nozzle is provided for protecting the nozzle front end portion, and also, the gas cooling the nozzle passes, as it is, the space between the nozzle and the nozzle cap to thereby blow off the blown-up fused metal. This nozzle protection method is disclosed in U.S. Pat. No. 4861962 (Hiper: Filed on Aug. 29, 1989).

Third Prior Art (Nozzle Protection Cap in Welding Torch)

As in the above Second Prior Art, Japanese Patent Laid-open Publication No. 53-119753 (HITACHI SEIKO: Filed on Mar. 30, 1977) discloses a plasma welding torch having a structure in which a metallic nozzle cap electrically insulated from the nozzle is mounted to the periphery of the nozzle and a secondary gas is blown between the nozzle and the nozzle protection cap.

Fourth Prior Art (Inclination of Cut Surface due to Gyrating Air-Current Effect)

In the plasma cutting, in general, a front side of a cut groove (kerf) is wide and a rear side thereof is narrow, and for this reason, the cut surface does not provide a perpendicular surface and has an inclination.

On the contrary, it is known that, in the plasma torch in which an operation gas is gyrated around a periphery of the axis of an electrode for stabilizing an arc to thereby jet out the arc, the cut surface does not provide a bilaterally symmetric surface and provides an asymmetric surface. By utilizing these phenomenon, in a condition that a front kerf width is wide and a rear kerf width is narrow, a perpendicular cutting can be done with respect to only one side surface to be cut by gyrating the operation gas, which technology is disclosed in "Welding Technology", Vol. 6, Jun., 1988.

In the above respective prior art, the following problems have been provided in points of (1) protection of nozzle, (2) contraction of plasma arc due to secondary gas, (3) temperature rising of nozzle protection cap, (4) adjustment of gyrating air and (5) electrical corrosion of a cooling water passage surface.

(1) Protection of Nozzle

In the plasma cutting, when a piercing working (hole formation cutting) is carried out to a thickened plate at a cutting operation start time, a fused metal (dross) blown up to the nozzle is stuck to the nozzle, which may result in the causing of a fuse damage to the nozzle or in the causing of an inaccurate discharge, so-called double-arc, in contact of the nozzle to a workpiece to be cut, thus damaging the nozzle.

Accordingly, as referred to in the above First Prior Art, there has been proposed a method, in which, in the plasma torch having the nozzle exposed, when the piercing working is done to a thickened plate, the piercing working is carried out at the highest position during the movement of the main arc to avoid the blow-up of the fused metal (dross) at the piercing working, and after the penetration of the hole, the torch is lowered to a position suitable for a cutting operation to start the cutting operation. However, according to this method, it is unavoidable to make complicated the height control of the torch at the cutting start time. Furthermore, there may be caused a case that a workpiece to be cut may be blown up by thermal deformation or in accordance with its supported condition, and it is difficult to avoid these phenomenon. When the nozzle contacts the workpiece to be cut, the double-arc is generated, thus being difficult to avoid causing of danger for damaging the nozzle.

In the torch having an air-cooled nozzle of the above Second Prior Art, which has been made in consideration of the above matters, there is disclosed a mechanism of the nozzle protection cap for preventing adhering of the fused metal to the nozzle and electrical contact of the nozzle to the workpiece to be cut at the time of the piercing operation. However, the technology of this Second Prior Art is adapted to the air-cooled type plasma torch but is not adapted to the technology of the First Prior Art of the plasma torch in which the nozzle is water-cooled because of the difference of the shape of the front portion of the torch. Furthermore, based on a mechanism for utilizing a cooling gas air-cooling the nozzle, it is necessary to flow a large amount of the cooling gas, and in order to ensure the large amount of the cooling gas, a plurality of openings, other than an opening passing the plasma arc on the torch axis, to the nozzle protection cap. Because of the formation of these openings, a large amount of the cooling gas is jetted on the surface of the workpiece to be cut, so that disturbance to the plasma arc is increased, thereby affecting a bad influence to the cutting operation, thus providing a problem.

In the above Third Prior Art, a protection cap is adapted to the water-cooled nozzle. However, this function has a function for preventing the nozzle from contacting the workpiece to be cut, but this function is for shutting out a welding portion from atmosphere by the secondary gas, and since an opening of the protection cap is widely opened, there is no function for protecting the nozzle from the blow-up of the fused metal at the piercing time.

(2) Contraction of Plasma Arc due to Second Gas

In the plasma cutting technology, a plasma arc of high temperature and high velocity is obtained by finely throttling the arc less than the nozzle diameter. If a large amount of current passes to a nozzle having a small nozzle diameter, it becomes possible to cut the workpiece at a high cutting speed with a narrow cut groove width. However, as the electric current increases, there causes a double-arc generation phenomenon in which the current passes a metallic portion of the nozzle without passing the nozzle orifice, thus lowering the cutting ability and damaging the nozzle.

In the technology of the First Prior Art, the operation gas is forcibly gyrated and jetted around the electrode to finely throttle the arc, and the nozzle is water-cooled to thereby hardly cause the double-arc. However, since the restriction of the plasma arc jetted from the nozzle is released and hence the plasma arc is swelled after the jetting-out from the nozzle, the cut groove width may be widened, thus providing a problem.

In the Second Prior Art, since the nozzle is not water-cooled, the cooling of the nozzle is insufficient and the double-arc is hence hardly caused and it is difficult to remarkably increase the electric current. Furthermore, although it is possible to further throttle the arc jetted from the nozzle by utilizing the secondary gas supplied so as to enclose the plasma arc by the nozzle protection cap, in the technology of the Second Prior Art, an opening is formed, other than the central opening for passing the secondary gas to enclose the plasma gas, for increasing the gas flow rate to cool the nozzle. Accordingly, it is impossible to independently control only the secondary gas surrounding the arc, and it is therefore difficult to achieve flow velocity or pressure sufficient for further throttling the plasma arc.

(3) Temperature Rising of Nozzle Protection Cap

Since only the air-cooling of the secondary gas is performed to the nozzle protection cap of the Second and Third Prior Art, the temperature of the nozzle protection cap rises due to the radiation from the plasma arc or the cut surface of the workpiece. Accordingly, in a case of exchanging consumable parts such as nozzle and electrode, it is required to effect the cooling for a time being by passing the secondary gas after the stopping of the arc or to exchange the consumable parts manually by utilizing for example hand gloves, thus being inconvenient and reducing workability at the time of exchanging the consumable parts.

(4) Adjustment of Gyrating Air Current Effect

As disclosed as the Fourth Prior Art, it is possible to obtain a perpendicular cut surface for the surface to be cut of one side by utilizing the fact that the cut surface is formed with an inclination by the gyrating air current effect. However, it is necessary to increase or decrease the strength of the gyrating air, that is, operation gas flow rate, for the adjustment of the inclined degree of the cut surface in conformity with the thickness of the workpiece to be cut and the cutting speed. However, the operation gas flow rate has its optimum value for maintaining stable the arc, and the increasing or decreasing of the operation gas flow rate results in the causing of the instable arc, and accordingly, it is difficult to adjust the inclined degree of the cut surface of the workpiece.

(5) Electrical Corrosion of Cooling Water Passage

As shown in the First Prior Art, in the plasma torch in which the electrode and the nozzle are water-cooled, the electrode and the nozzle abut, in the fixed state, against respectively insulated metallic portions of the torch body, and power from a D.C. power source is supplied to the metallic portions, respectively. A cooling water passage connecting the metallic portion of the electrode side and the metallic portion of the nozzle side is formed for cooling the electrode and the nozzle.

An electric potential is caused between the metallic portion of the electrode side and the metallic portion of the nozzle side during the generation of the plasma arc. At this time, the torch body is constructed in a condition that the respective metallic portions are electrically insulated, but the respective metallic portions are connected with each other through the cooling water passage and the cooling water passes therethrough, so that a minute electric current passes through the cooling water. This minute electric current hardly affects the generation of the arc, but corrosion on the metallic portion of the torch body gradually progresses by an electrochemical function due to this electric current. Thus, in the torch in which the electrode and the nozzle are water-cooled, there will be provided such a problem that the torch becomes unusable before long.

DISCLOSURE OF THE INVENTION

The present invention was conceived in view of the above matters and aims to provide a plasma arc capable of: achieving a function for effectively protecting a nozzle in a torch structure in which the nozzle is water-cooled to remarkably improve the life time of the nozzle; reducing a loss in time caused by the exchange of the nozzle and the running cost; performing a precise cutting operation with a fine cut groove width by rectifying the secondary gas by an insulator interposed in the secondary gas passage and then again throttling the plasma arc jetted from the nozzle 2; changing an inclination of a cut surface of the workpiece to a perpendicular direction by gyrating a gyration flow of the secondary gas in the same direction as the gyrating direction of the plasma arc; exchanging only the front end portion of the nozzle protection cap as a consumable part, thus being economical, because the nozzle protection cap can be separated into the front end portion and the base end portion; handing the base end portion of the nozzle protection cap without paying any specific attention to that portion at a time of maintenance or inspection because the base end portion of the nozzle protection cap can be cooled by the cooling water; and further, reducing generation of an electrochemical corrosion due to the cooling water.

In order to achieve the above object, the plasma torch according to the present invention has a structure in which a water-cooled electrode 1 is utilized and a plasma arc is generated between the electrode 1 and a workpiece 24 to be cut through an orifice 16 of a nozzle arranged so as to cover the electrode 1 through a plasma gas passage formed therebetween and the plasma torch is characterized in that a nozzle protection cap 5, 5*a*, 5*b*, 5*c* or 5*d* having, on its front end side, an opening opposing to the orifice 16 of the nozzle 2 is secured, in an electrically insulated state from the electrode 1 and the nozzle 2, to a portion outside a nozzle cap 4 so as to form an annular secondary gas passage 8 communicating with the opening between the nozzle protection cap and the nozzle cap 4, and an insulator 14 having an annular structure of an electrically insulating material and having a rectifying passage for rectifying a gas flow passing the secondary gas passage 8 is interposed in the secondary gas passage 8.

Further, the nozzle protection cap 5 is formed of a metal material having a good thermal conductivity.

Further, the insulator 14 has a rectangular section and the insulator 14 is fixedly engaged with stepped portions formed to an outer peripheral surface of the nozzle cap 4 and an inner peripheral surface of the nozzle protection cap.

Further, the nozzle protection cap 5*b* is composed of a front end portion 20 for protecting a front end portion of the nozzle 2 and a base end portion 19 secured to a torch body side, the front end portion 20 and the base end portion 19 being coupled detachably.

Further, flanged portions are provided for the front end portion 20 and the base end portion 19 constituting the nozzle protection cap 5*b* so as to be fitted to each other, or screws are formed to portions of the front end portion 20 and the base end portion 19 coupled with each other so that the front end portion 20 and the base end portion 19 are fitted to or screwed with each other in an easily detachable manner.

Further, the front end portion 20 among the front end portion 20 and the base end portion 19 constituting the nozzle protection cap 5*b* is formed of a metal material having a good thermal conductivity and the base end portion 19 thereamong is formed of a metal material being excellent in mechanical strength.

Further, a gap 17 between the front end surface of the nozzle 2 and an inside surface of the opening of the nozzle protection cap 5, 5*a* or 5*b* has a dimension h of 0.5 -1.5 mm.

Further, a ratio $\Phi_2/\Phi_1$ between an orifice diameter $\Phi_1$ of the nozzle 2 and an opening diameter $\Phi_2$ of the nozzle protection cap 5, 5*a* or 5*b* is set to 1.0–5.0.

Further, an annular cooling water chamber 21 is formed inside the base end portion of the nozzle protection cap 5*c* so that the cooling water chamber 21 is communicated with a cooling water chamber 9 formed inside the electrode 1.

Further, the nozzle protection cap 5*d* is formed so as to have a bag-shape double wall structure having a space formed as a cooling water chamber 21*a*.

Further, a plasma gas flow-in passage 6*a* for introducing the plasma gas into a plasma gas passage 6 formed around the electrode 1 is formed, in an inclined manner with respect to an axis of the torch, for imparting a gyrating flow to the plasma gas, the rectifying passage of the insulator 14 or 14*a* is formed to provide a spiral shape for imparting a gyrating flow to the secondary gas passing the rectifying passage in the same direction as the gyrating flow of the plasma gas, and a relationship between an orifice length L and the orifice diameter $\Phi_1$ is satisfied with $L/\Phi_1 \leqq 2$.

Still further, a flow-in passage 25 communicating the cooling water chamber 9 on the side of the electrode 1 with the cooling water passage 10 on the side of the nozzle 2 is composed of a tube 26 formed of an electrically insulating material.

The plasma torch having the embodiments described above attains the following functions and effects.

The plasma arc jetted from the nozzle together with the plasma gas is jetted through the nozzle 2 and the nozzle orifice 16. At this moment, the secondary gas is jetted in a direction towards the plasma arc from the gap 17 and then the secondary gas is rectified by the insulator 14.

The nozzle cap 4 and the nozzle protection cap 5 are axially aligned by the insulator and then coupled together.

Only the front end portion of the nozzle protection cap composed of the front end portion 20 and the base end portion 19 or 19*a* can be exchanged as a consumable part.

The nozzle protection cap can be cooled by providing the cooling water chamber to the base end portion 19*a* of the nozzle protection cap.

The plasma gas is gyrated in the plasma gas passage 6 and the secondary gas is also gyrated in the plasma gas flow-in passage 6*a* in the same direction as that of the plasma gas.

The electrochemical corrosion can be prevented by fitting the tube 26 formed of an electrically insulating material into a cooling water flow passage.

According to the present invention, the nozzle protection function can be effectively achieved also with respect to a torch structure in which the nozzle 2 is water-cooled, and accordingly, the life time of the nozzle 2 can be remarkably improved and the loss in time in the nozzle exchanging operation and the running cost can be reduced. Furthermore, by interposing the insulator in the secondary gas passage, the secondary gas is rectified by the insulator and the plasma arc jetted from the nozzle 2 is again throttled, thereby performing the precise cutting operation with a fine cut groove.

Furthermore, since the secondary gas can be gyrated in the same direction as the gyrating direction of the plasma arc by the rectifying passage of the insulator 14 or 14*a*, the inclination of the cut surface of the workpiece 24 can be changed to the perpendicular direction.

Furthermore, since the nozzle protection cap is separated into the front end portion and the base end portion, only the front end portion can be exchanged as a consumable part, thus being economical.

The above and further objects, embodiments and advantages of the present invention will be further made clear by those skilled in the art from the descriptions made hereunder with reference to the accompanying drawings in which preferred examples conforming with the principle of the present invention are described as preferred embodiments.

DETAILED DESCRIPTION OF THE PREFERRED EMBODIMENTS

Figure 1:
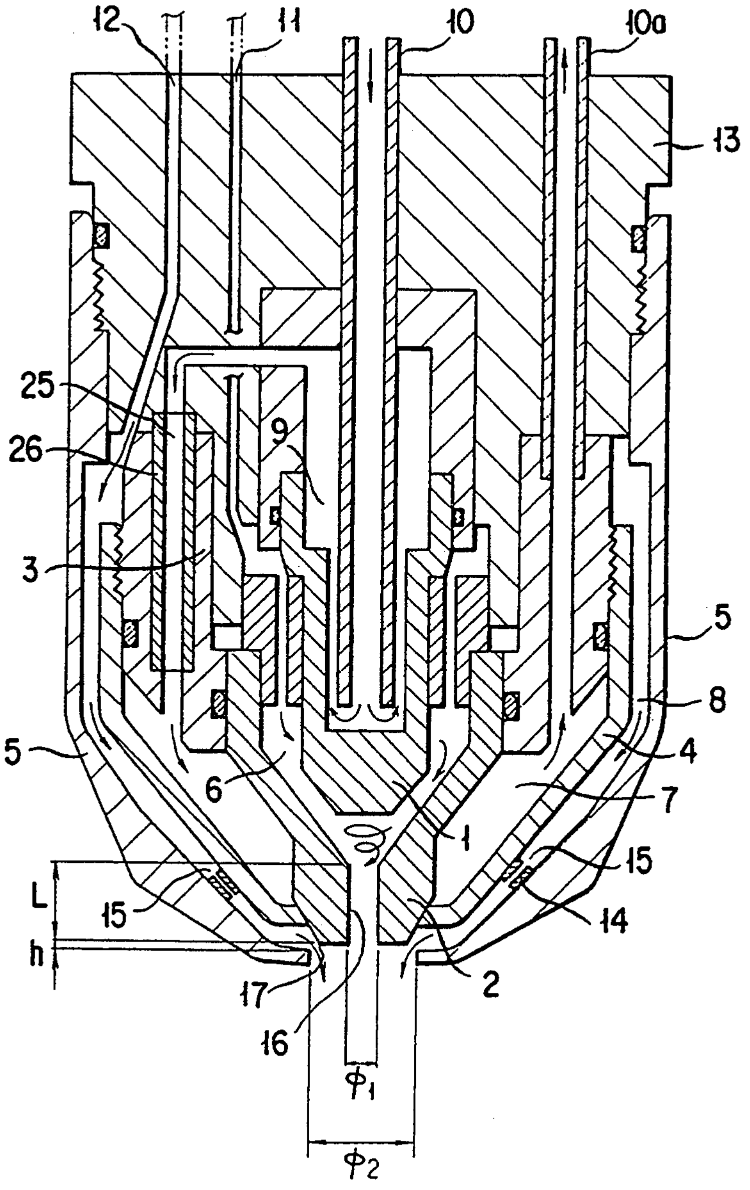
FIG. 1 is a sectional view showing one concrete embodiment of the present invention.
Figure 2A:
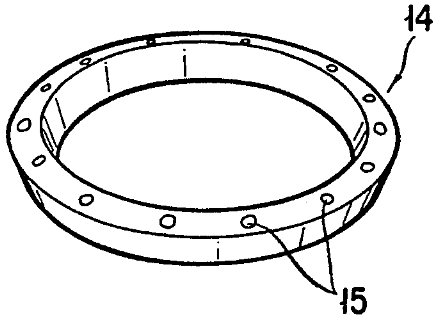
FIGS. 2(*a*) to 2(*e*) are perspective, plan and front views of different examples of insulators.
Figure 2B:
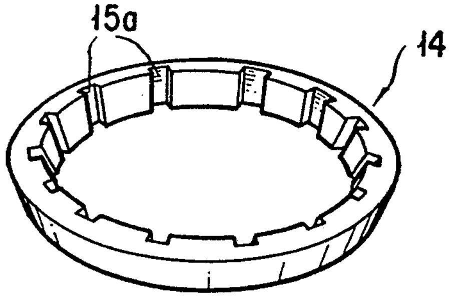
Figure 2C:
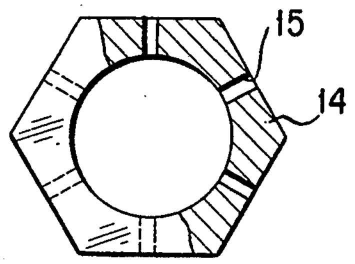
Figure 2D:
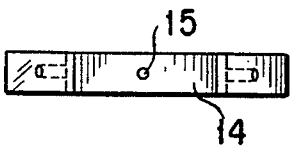
Figure 2E:
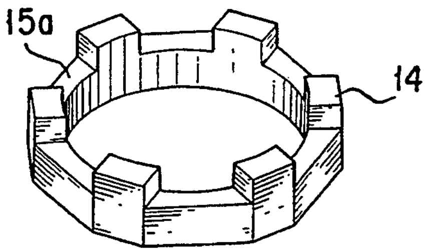

Hereinbelow, several embodiments of the present invention will be described in detail in conjunction with the accompanying drawings.

In the drawings, reference numeral 1 denotes an electrode, numeral 2 is a nozzle supported by a nozzle support member 3 at a portion opposing to the front end of the electrode 1, numeral 4 denotes a nozzle cap covering the nozzle 1 except for the lower end portion thereof, and numeral 5 denotes a nozzle protection cap covering an outside of the nozzle cap 4. Around the periphery of the electrode 1 there is formed a plasma gas passage 6 communicated with the nozzle 2 from this periphery, and a cooling water passage 7 is formed between the nozzle 2 and the nozzle cap 4. Furthermore, a secondary gas passage 8 is formed between the nozzle cap 4 and the nozzle protection cap 5 so as to open to the front end side of the nozzle 2.

The nozzle protection cap 5 is electrically insulated from the nozzle cap 4, and the nozzle 2 is supported also by the front end portion of the nozzle cap 4.

A cooling water chamber 9 is formed inside the electrode 1 and this cooling water chamber 9 is, on one hand, communicated with the cooling water passage 7. A cooling water flow-in passage 10 is communicated with the cooling water chamber 9 and a cooling water flow-out passage 10*a* is, on the other hand, connected with the cooling water passage 7. A plasma gas flow-in passage 11 and a secondary gas flow-in passage 12 are connected respectively to the plasma gas passage 6 and the secondary gas passage 8.

Reference numeral 13 denotes a torch body, which is electrically insulated from the electrode 1 and the nozzle 2. The nozzle protection cap 5 is screwed with this torch body 13.

The secondary gas passage 8 formed between the nozzle cap 4 and the nozzle protection cap 5 provides a tapered annular shape, and an insulator 14 formed of an insulating material, also acting as a spacer, is mounted in the secondary gas passage 8 in an air-tight manner with respect to walls of the nozzle cap 4 and the nozzle protection cap 5. The insulator 14 is provided with a plurality of small openings 15 in the circumferential direction of the insulator so as to constitute rectifying passages communicating the downstream side and the upstream side of the insulator with each other.

These small openings forming the rectifying passage may be formed as axial grooves 15*a* formed on an inner (or outer) surface of the insulator 14 as shown in FIG. 2(*b*) in place of small openings 15 shown in FIG. 2(*a*).

The small openings 15 and the grooves 15*a* forming the rectifying passage may be formed so as to provide spiral shapes with respect to the axis of the insulator.

Further, the insulators 14 shown in FIGS. 2(*a*) and 2(*b*) are formed with the tapered annular shapes in conformity with the tapered annular shape of the secondary gas passage 8, but the shape of the insulator 14 is not limited to those shown in FIGS. 2(*a*) and 2(*b*) and the insulator 14 may be formed so as to provide a rectangular shape in section as shown in FIG. 2 (*c*), 2 (*d*) or 2 (*e*) for passing the rectified secondary gas along the axial direction.

It is desired that a ratio ($\Phi_2/\Phi_1$) between a diameter $\Phi_1$ of an orifice 16 of the nozzle 2 and a diameter $\Phi_2$ of an opening of the nozzle protection cap 5 is 1.0 to 5.0, and preferably 2.0 to 4.0, wherein in the case of $\Phi_2/\Phi_1<1.0$, the front end of the nozzle protection cap 5 is deformed and damaged by the heat of the plasma arc and, moreover, the flow of the secondary gas is disturbed, and in the case of $\Phi_2/\Phi_1>5.0$, the blow-up of the fused metal adheres to the nozzle 2 and the gap 17 between the lower surface of the nozzle 2 and the nozzle protection cap 5, causing the double-arc.

Further, it is desired that the gap 17 has a gap dimension h of 0.5 to 1.5 mm, wherein in the case of $h<0.5$ mm, the flow velocity of the secondary gas jet is too fast to disturb the arc.

The insulators 14 described above are formed of a synthetic resin such as fluoride series resin or ceramics material.

According to the above structure, the plasma arc generated from the electrode 1 is jetted, together with the plasma gas supplied to the plasma gas passage 6 formed around the electrode 1, through the nozzle 2 and the opening of the nozzle protection cap 5. At this moment, the nozzle 2 is cooled by the cooling water passing through the cooling water passage 7. Further, the secondary gas is jetted through the secondary gas passage 8 so as to enclose the periphery of the plasma from the gap 17, and in this time, the secondary gas is rectified during the passing through the insulator 14.

Namely, the secondary gas passing through the annular secondary gas passage 8 is rectified during the passing through the rectifying passage constituted by the small holes 15 or grooves 15*a* formed to the insulator 14.

Further at this time, it can be made possible to supply the secondary gas jetted so as to enclose the plasma arc with sufficient flow rate and at sufficient flow velocity by setting, to an optimum value, the dimension h of the gap 17 between the lower end surface of the nozzle 2 and the nozzle protection cap 5.

Furthermore, the nozzle 2 can be protected from the blow-up of the fused metal at the time of the piercing operation by setting the opening diameter $\Phi_2$ of the nozzle protection cap 5.

Figure 3:
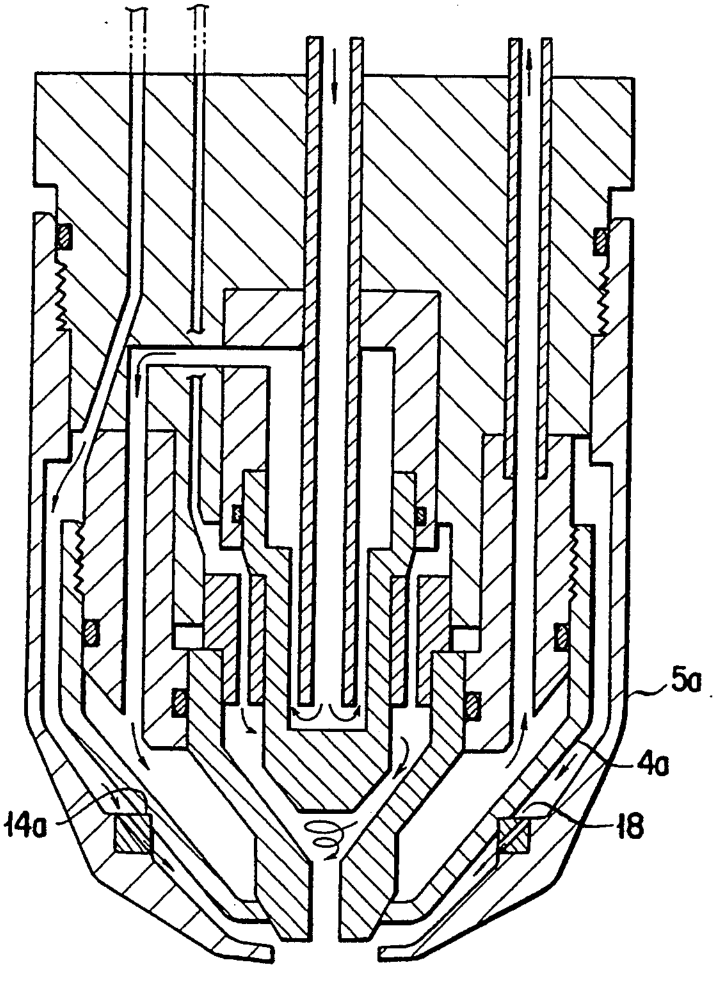
FIG. 3 is a sectional view of another embodiment of the present invention.

Another embodiment of the present invention is described hereunder with reference to FIG. 3.

FIG. 3 shows an alternation of the insulator, in which the insulator 14*a* is formed annularly from a material having a rectangular section, and this insulator 14*a* is fitted to stepped portions formed to opposing portions of the nozzle cap 4*a* and the nozzle protection cap 5*a* and fixed thereto. A rectifying passage 18 is formed to an outer peripheral side of the insulator 14*a*.

According to this structure, the nozzle cap 4*a* and the nozzle protection cap 5*a* are axially aligned by the insulator 14*a*, thus performing the positioning of these members.

Figure 4:
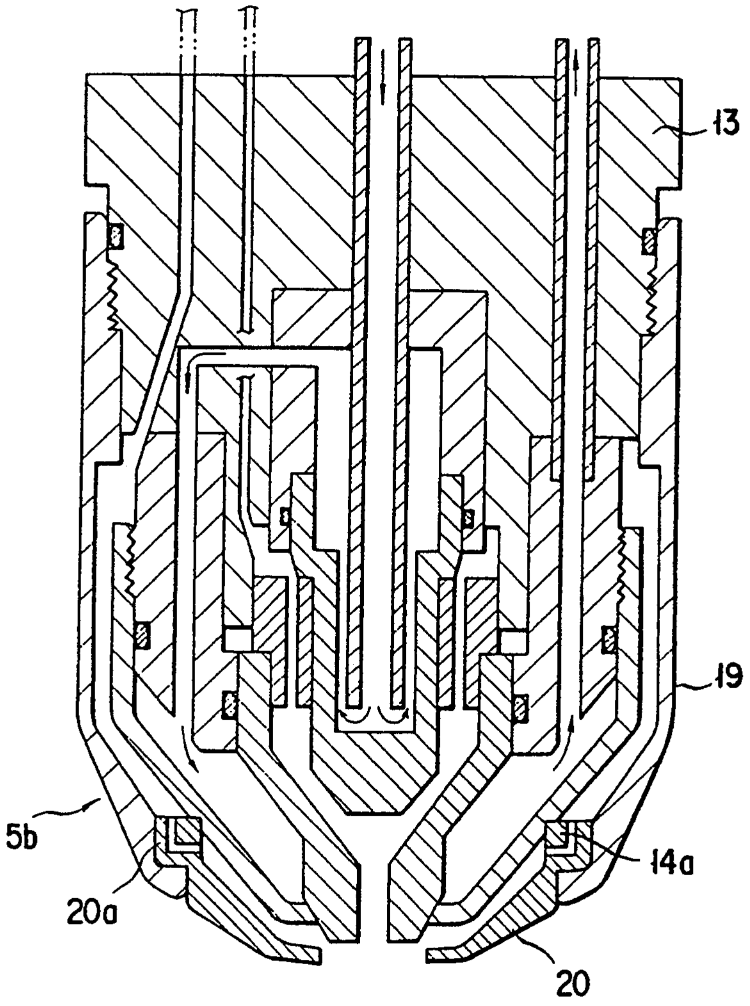
FIGS. 4 to 7 are sectional views of further embodiments of the present invention.

FIG. 4 shows a further embodiment in which the nozzle protection cap is provided with a front end side portion and a base end side portion which are formed of different materials.

Namely, the nozzle protection cap 5*b* has the base end portion 19 screwed with the nozzle body 13 and the front end portion 20 on the side of the nozzle 2, these portions 19 and 20 being formed by the different members, and the insulator 14*a* is supported on the side of this front end portion 20.

The coupling of the base end portion 19 and the front end portion 20 will be performed by providing a flange portion 20*a* on the side of the front end portion and a flange portion, which is engaged with the flange portion 20*a*, formed to the base end portion 19. The flange portion of the base end portion 19 is fixedly fitted to this flange portion 20a or both end portions are fixedly screwed with each other by means of screws.

In the usage of the plasma torch, the front end portion of the nozzle protection cap 5b is damaged, but according to this embodiment, only the front end portion 20 thereof can be exchanged, thus being economical in comparison with a full change of the nozzle protection cap.

Furthermore, since the nozzle protection cap 5b is provided with the divided base end portion 19 and front end portion 20, it is possible that both the portions can be formed with different materials, and by forming the front end portion 20 with a material having a good thermal conductive property, even if high temperature fused metal adheres, the fused metal can be cooled for a short time and then easily peeled off. Further, the torch cannot be deformed even in contact with the workpiece to be cut by forming the base end portion 19 with a material having good mechanical strength.

Figure 5:
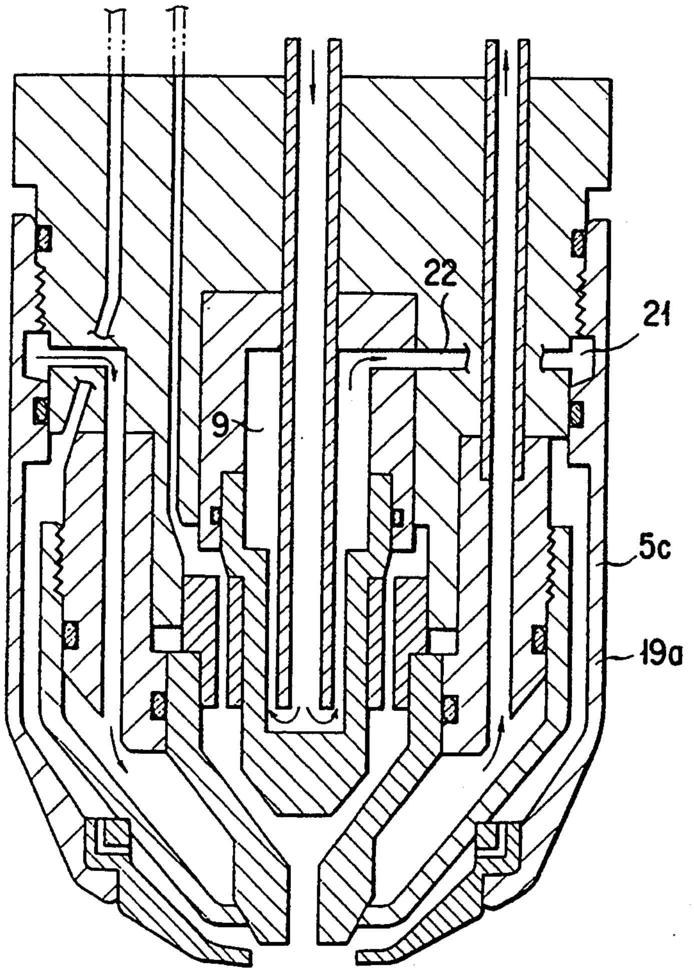

Furthermore, FIG. 5 shows a further embodiment capable of cooling the nozzle protection cap.

Namely, an annular cooling water chamber 21 is formed inside a base end portion 19a of a nozzle protection cap 5c and the annular cooling water chamber 21 communicates with a cooling water chamber 9 inside the electrode 1 on the side of the electrode 1.

According to this structure, the base end portion of the nozzle protection cap 5c is cooled by the cooling water in the cooling water chamber 21 to thereby suppress the temperature rising of the nozzle protection cap.

Figure 6:
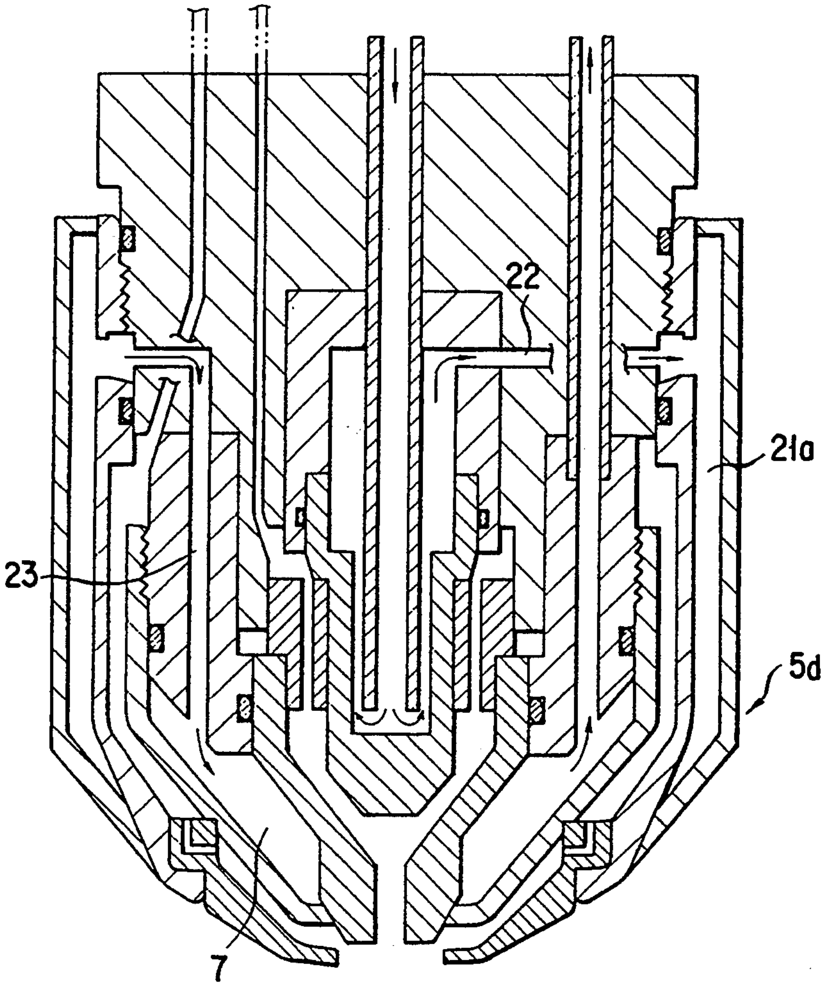

FIG. 6 shows a further embodiment having a structure for cooling the nozzle protection cap, in which the cooling water chamber 21a of the nozzle protection cap 5d is formed to provide a vertically widened annular structure to thereby improve a cooling capacity to that portion. With this cooling water chamber 21a, other than the passage 22 on the flow-in side communicated with the cooling water chamber 9 on the side of the electrode 1, there is communicated a passage on a flow-out side communicated with the cooling water passage 7 provided around the nozzle 2.

Figure 7:
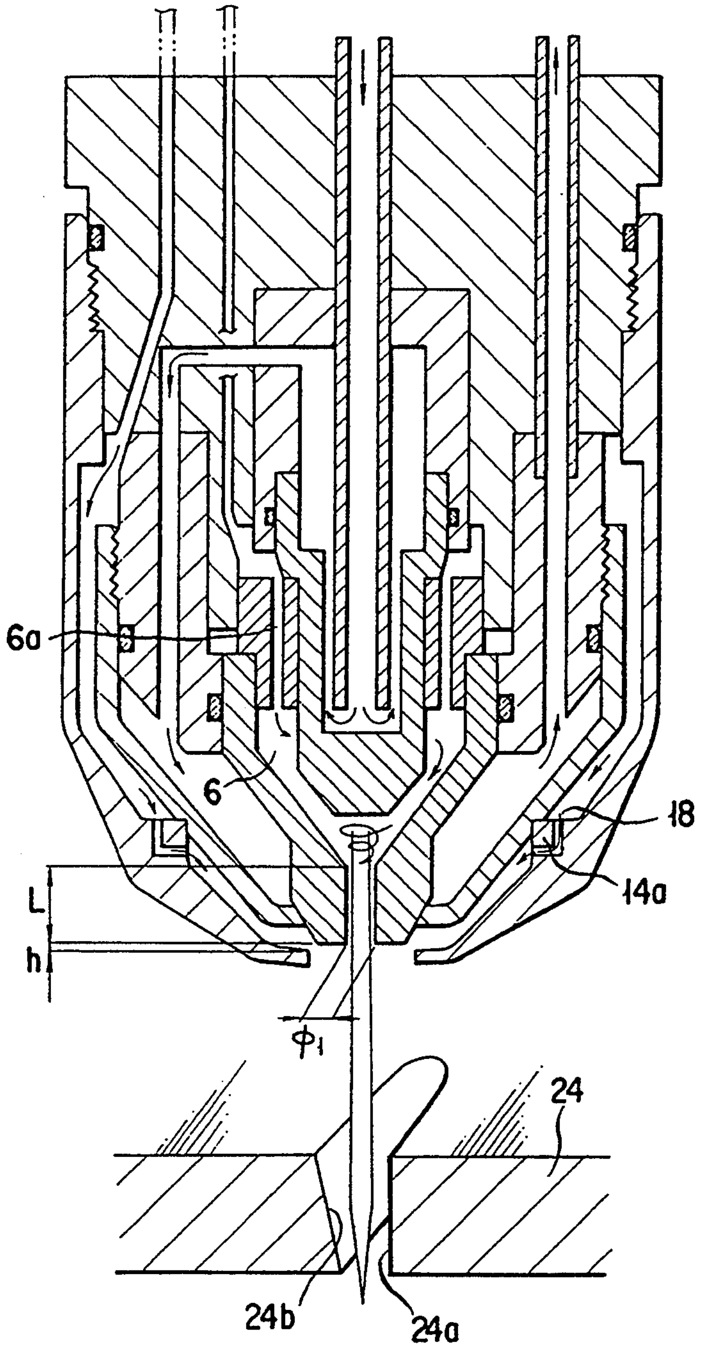

Further, in an insulator 14a shown in FIG. 7, the secondary gas flow jetted from the gap of the nozzle protection cap can be made as a gyrating flow by forming spirally, with respect to the central portion of the torch, the rectifying passage 18 formed to the insulator 14a.

Figure 8:
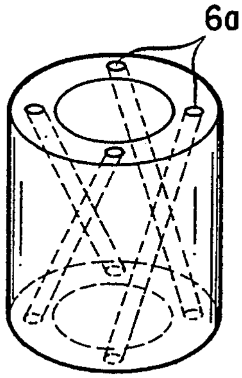
FIG. 8 is a perspective view showing a structure of a plasma gas flow-in passage.

Furthermore, a plurality of plasma gas flow-in passages 6a for introducing the plasma gas into the plasma gas passage 6 provided around the electrode 1 are formed as shown in FIG. 8 with an inclined state with respect to the axis of the torch so as to thereby impart the gyrating flow to the plasma gas flow blown into the plasma gas passage 6.

With this structure, the length L of the orifice of the nozzle 2 is determined to have relation of $L/\Phi_1 \leqq 2$ with respect to the orifice diameter $\Phi_1$.

In this structure, the gyrating direction of the secondary gas is made to accord with the gyrating direction of the plasma gas.

When a workpiece 24 is cut as shown in FIG. 7 by the plasma torch of this embodiment, the wall 24a to be cut on the upstream side of the gyrating flow of the secondary gas is made perpendicular and another wall 24b is cut with inclination so as to open at its front end side.

As described above, for example, in a case where the secondary gas is gyrated rightwardly, as viewed from an upper side, the right side cut wall 24a is made perpendicular.

Furthermore, in the above embodiments, in order to reduce the electrochemical corrosion due to the cooling water, it is necessary to reduce the electric current passing through the cooling water and, for this reason, it is therefore necessary to reduce an area contacting to a metallic portion of the whole torch structure.

From the above fact, as shown in FIG. 1, a tube 26 formed of an electrically insulating material is fitted into the flow-in passage 25 communicating the cooling water chamber 9 on the side of the electrode 1 with the cooling water passage 10 on the side of the nozzle 2.

We claim:

1. A plasma torch for cutting use comprising:

a torch body;

an electrode arranged in the torch body;

nozzle means arranged outside the electrode for covering the electrode, with a plasma gas passage formed therebetween, said nozzle means being provided with a nozzle orifice;

a nozzle cap for covering the nozzle means, said nozzle cap having an outer peripheral surface with a stepped portion;

a nozzle protection cap having a front end side with an opening opposing the orifice of the nozzle means, said nozzle protection cap being disposed outside the nozzle cap with an annular secondary gas passage therebetween communicating with the opening, said nozzle protection cap being electrically insulated from the electrode and the nozzle means, and said nozzle protection cap having an inner peripheral surface with a stepped portion; and an insulator disposed in the secondary gas passage and formed of an electrically insulating material, said insulator having a rectifying passage for rectifying a gas flow passing through the secondary gas passage, said insulator having a rectangular section and said insulator being fixedly engaged with said stepped portions formed in the outer peripheral surface of the nozzle cap and the inner peripheral surface of the nozzle protection cap.

2. A plasma torch for cutting use comprising:

a torch body having an axis;

an electrode arranged in the torch body, said electrode having a cooling water chamber therein;

nozzle means arranged outside the electrode for covering the electrode, with a plasma gas passage formed therebetween, said nozzle means being provided with a nozzle orifice;

a nozzle cap for covering the nozzle means;

a nozzle protection cap having a front end side with an opening opposing the orifice of the nozzle means, said nozzle protection cap being disposed outside the nozzle cap with an annular secondary gas passage therebetween communicating with the opening, said nozzle protection cap being electrically insulated from the electrode and the nozzle means, said nozzle protection cap having a base end portion with a double wall structure defining a space formed as an annular cooling water chamber which is in communication with the cooling water chamber formed inside the electrode; and an insulator disposed in the secondary gas passage and formed of an electrically insulating material, said insulator having a rectifying passage for rectifying a gas flow passing through the secondary gas passage;

a plasma gas passage; and a plasma gas flow-in passage, formed around the electrode in an inclined manner with respect to said axis of the torch body, said plasma gas flow-in passage being arranged for introducing plasma gas into said plasma gas passage and for imparting a gyrating flow to the introduced plasma gas;

wherein said rectifying passage of the insulator is formed to provide a spiral shape for imparting a gyrating flow, in the same direction as the gyrating flow of the plasma gas, to the secondary gas passing through the rectifying passage; and wherein a relationship between the orifice length L and the orifice diameter $\Phi_1$ is satisfied by $L/\Phi_2 \leqq 2$.

3. A plasma torch for cutting use comprising:

a torch body having an axis;

an electrode arranged in the torch body;

nozzle means arranged outside the electrode for covering the electrode, with a plasma gas passage formed therebetween, said nozzle means being provided with a nozzle orifice;

a nozzle cap for covering the nozzle means;

a nozzle protection cap having a front end side with an opening opposing the orifice of the nozzle means, said nozzle protection cap being disposed outside the nozzle cap with an annular secondary gas passage therebetween communicating with the opening, said nozzle protection cap being electrically insulated from the electrode and the nozzle means; and an insulator disposed in the secondary gas passage and formed of an electrically insulating material, said insulator having a rectifying passage for rectifying a gas flow passing through the secondary gas passage;

a plasma gas passage formed around the electrode;

plasma gas flow-in passage, formed around the electrode in an inclined manner with respect to said axis of the torch body, for introducing plasma gas into said plasma gas passage and for imparting a gyrating flow to the introduced plasma gas; and said rectifying passage of the insulator being formed to provide a spiral shape for imparting a gyrating flow, in the same direction as the gyrating flow of the plasma gas, to the secondary gas passing through the rectifying passage.

4. A plasma torch according to claim 3, wherein a relationship between an orifice length L and an orifice diameter $\Phi_1$ is satisfied by $L/\Phi_1 \leqq 2$.

5. A plasma torch for cutting use comprising:

a torch body having an axis;

an electrode arranged in the torch body;

nozzle means arranged outside the electrode for covering the electrode, with a plasma gas passage formed therebetween, said nozzle means being provided with a nozzle orifice;

a nozzle cap for covering the nozzle means;

a nozzle protection cap having a front end side with an opening opposing the orifice of the nozzle means, said nozzle protection cap being disposed outside the nozzle cap with an annular secondary gas passage therebetween communicating with the opening, said nozzle protection cap being electrically insulated from the electrode and the nozzle means, said nozzle protection cap being provided with a front end portion for protecting a front end portion of the nozzle means and a base end portion secured to the torch body, said front end portion and said base end portion being detachably coupled together;

an insulator disposed in the secondary gas passage and formed of an electrically insulating material, said insulator having a rectifying passage for rectifying a gas flow passing through the secondary gas passage;

a plasma gas passage; and a plasma gas flow-in passage, formed around the electrode in an inclined manner with respect to said axis of the torch body, said plasma gas flow-in passage being arranged for introducing plasma gas into said plasma gas passage and for imparting a gyrating flow to the introduced plasma gas;

wherein said rectifying passage of the insulator is formed to provide a spiral shape for imparting a gyrating flow, in the same direction as the gyrating flow of the plasma gas, to the secondary gas passing through the rectifying passage; and wherein a relationship between the orifice length L and the orifice diameter $\Phi_1$ is satisfied by $L/\Phi_1 \leqq 2$.

6. A plasma torch according to claim 5, wherein said front end portion is provided with a flanged portion and said base end portion is provided with a flanged portion detachably engaged with the flanged portion of the front end portion.

7. A plasma torch according to claim 5, wherein said front end portion is provided with a screw thread and said base end portion is provided with a screw thread detachably engaged with the screw thread of the front end portion.

8. A plasma torch according to claim 5 wherein said front end portion is formed of a metal materials having a good thermal conductivity and said base end portion is formed of a metal material having excellent mechanical strength.

9. A plasma torch according to claim 5, further including a cooling water chamber formed inside the electrode, and an annular cooling water chamber formed inside the base end portion of the nozzle protection cap in communication with the cooling water chamber formed inside the electrode.

10. A plasma torch according to claim 5, wherein said electrode has a cooling water chamber therein and said nozzle means has a cooling water passage formed at a side thereof; and further including a flow-in passage formed at a side of the electrode for communicating the cooling water chamber with the cooling water passage, said flow-in passage including a tube member formed of an electrically insulating material.

11. A plasma torch according to claim 5, wherein said electrode is a water-cooled electrode.

12. A plasma torch for cutting use comprising:

a torch body;

an electrode arranged in the torch body;

nozzle means arranged outside the electrode for covering the electrode, with a plasma gas passage formed therebetween, said nozzle means being provided with a nozzle orifice;

a nozzle cap for covering the nozzle means;

a nozzle protection cap having a front end side with an opening opposing the orifice of the nozzle means, said nozzle protection cap being disposed outside the nozzle cap with an annular secondary gas passage therebetween communicating with the opening, said nozzle protection cap being electrically insulated from the electrode and the nozzle means;

an insulator disposed in the secondary gas passage and formed of an electrically insulating material, said insulator having a rectifying passage for rectifying a gas flow passing through the secondary gas passage; and said nozzle having a front end surface opposing a distal end of said front end side of the nozzle protection cap through a gap therebetween, said gap having a dimension h of 0.5–1.5 mm in order to increase the assist gas flow rate.

13. A plasma torch for cutting use comprising:

a torch body;

an electrode arranged in the torch body;

nozzle means arranged outside the electrode for covering the electrode, with a plasma gas passage formed therebetween, said nozzle means being provided with a nozzle orifice;

a nozzle cap for covering the nozzle means;

a nozzle protection cap having a front end side with an opening opposing the orifice of the nozzle means, said nozzle protection cap being disposed outside the nozzle cap means with an annular secondary gas passage therebetween communicating with the opening, said nozzle protection cap being electrically insulated from the electrode and the nozzle means;

an insulator disposed in the secondary gas passage and formed of an electrically insulating material, said insulator having a rectifying passage for rectifying a gas flow passing through the secondary gas passage; and a ratio $\Phi_2/\Phi_1$ between an orifice diameter $\Phi_1$ of the nozzle and an opening diameter $\Phi_2$ of the nozzle protection cap being set to 1.0–5.0.

* * * * *